(12) United States Patent
Moore et al.

(10) Patent No.: US 7,947,393 B2
(45) Date of Patent: May 24, 2011

(54) ALKALINE ELECTROCHEMICAL CELL

(75) Inventors: William James Moore, Lakewood, OH (US); Jianjun Wu, Olmsted Township, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 1884 days.

(21) Appl. No.: 10/713,833

(22) Filed: Nov. 14, 2003

(65) Prior Publication Data

US 2005/0106461 A1 May 19, 2005

(51) Int. Cl.
*H01M 4/42* (2006.01)
(52) U.S. Cl. ........ 429/229; 429/133; 429/212; 429/206; 429/164
(58) Field of Classification Search .................. 429/133, 429/229
See application file for complete search history.

(56) References Cited

U.S. PATENT DOCUMENTS

| | | | | |
|---|---|---|---|---|
| 5,082,622 | A | 1/1992 | Meeus et al. | 420/514 |
| 5,209,995 | A * | 5/1993 | Tada et al. | 429/229 |
| 6,022,639 | A | 2/2000 | Urry | 429/229 |
| 6,265,105 | B1 | 7/2001 | Tokuda et al. | |
| 6,482,543 | B1 | 11/2002 | Shelekhin et al. | |
| 6,991,875 | B2 * | 1/2006 | Christian et al. | 429/223 |
| 2002/0134964 | A1 | 9/2002 | Christian et al. | |
| 2004/0033418 | A1 * | 2/2004 | Armacanqui et al. | 429/212 |
| 2004/0115532 | A1 * | 6/2004 | Malservisi et al. | 429/229 |
| 2004/0166413 | A1 | 8/2004 | Clash et al. | 429/229 |

FOREIGN PATENT DOCUMENTS

| | | |
|---|---|---|
| WO | 9850969 | 11/1998 |
| WO | 0048260 | 8/2000 |

* cited by examiner

*Primary Examiner* — Patrick Ryan
*Assistant Examiner* — Ben Lewis
(74) *Attorney, Agent, or Firm* — Michael C. Pophal

(57) ABSTRACT

An alkaline electrochemical cell capable of providing optimum run times at both high drain rates and low drain rates is disclosed. In one embodiment, the cell's gelled anode incorporates a limited quantity of zinc powder having specific physical characteristics that enable it to discharge efficiently over a wide range of electrical discharge conditions. The anode may also include an electrolyte that is selected to improve the zinc's discharge efficiency.

44 Claims, 4 Drawing Sheets

Fig. 2

| SERVICE TESTS | CUT | CELLS OF THIS INVENTION | COMPETITORS | | | | |
|---|---|---|---|---|---|---|---|
| | | | A | B | C | D | E |
| 43 OHM FOR 4 HOURS PER DAY | 0.90 | 77.8% | 69.1% | 72.8% | 71.4% | 69.4% | 69.2% |
| 250 mA FOR 1 HOUR PER DAY | 0.90 | 61.1% | 52.7% | 56.4% | 53.1% | 54.2% | 51.7% |
| 1000 mW CONTINUOUS | 1.00 | 22.8% | 14.0% | 16.5% | 16.8% | 17.4% | 17.0% |

Fig. 3

| TEST | CUT | CELLS OF THIS INVENTION | COMPETITOR A | COMPETITOR B | COMPETITOR C | COMPETITOR D | COMPETITOR E |
|---|---|---|---|---|---|---|---|
| 1K MW CONT 21C | 1.0 min | 60.0 / 5 | 37.0 / 6 | 44.0 / 6 | 44.0 / 5 | 47.0 / 6 | 45.0 / 6 |
| 250 MA 1 HR/DY 21C | 0.9 min | 552.4 / 10 | 476.8 / 6 | 510.1 / 6 | 480.0 / 6 | 490.2 / 6 | 467.6 / 6 |
| 43 OHM 4 HR/DY 21C | 0.9 h | 100.4 / 8 | 89.8 / 6 | 96.7 / 6 | 92.4 / 6 | 90.0 / 6 | 89.9 / 6 |

ALKALINE ELECTROCHEMICAL CELL

BACKGROUND OF THE INVENTION

This invention generally relates to a mercury free alkaline cell comprising a zinc anode. More particularly, this invention is concerned with an alkaline electrochemical cell that is capable of providing optimum service at various discharge conditions.

Commercially available cylindrical alkaline electrochemical cells are widely available in cell sizes commonly known as AA, AAA, C and D. In many cases the cells are purchased by consumers and then stored until they are needed to power a device. Due to the proliferation of battery powered devices, many consumers own numerous battery powered devices. Some of the devices that may be found in one home include: a radio; a remote control for a television set; a tape recorder; toys for children; an handheld electronic game; a compact disc player; a camera that incorporates a flashlight unit and 35 millimeter film; and a digital camera. Collectively, these devices represent a wide range of electrical discharge conditions. For example, a wall clock is known within the battery manufacturing field as a "low drain" device because it needs the battery to supply current at a very low rate and with brief rest periods between activations. Consequently, the clock may be powered for more than a year by a single AA size battery. Another device, such as a compact disc player, requires several batteries to supply current at a faster rate than is required by a clock but with substantial rest periods between activations (i.e. 250 milliamps for one hour per day) and is known as a "high tech" device. Other devices, such as a digital camera, require the battery to supply a substantial current at a high voltage (i.e. a 1000 milliwatt drain with no rest periods) and is recognized as a "high drain" device. When consumers purchase batteries, the consumer may not know the device into which a particular battery will be inserted. Consequently, the consumer will attempt to purchase batteries that perform well in a variety of devices that may incorporate low drain, high drain and/or high tech discharge conditions. If a consumer believes that a particular brand of battery provides optimum service when used in all devices, then the consumer will be motivated to buy that brand of batteries rather than a different brand of batteries. Consequently, many battery manufacturers strive to develop and market batteries that are perceived by the consumer as "all purpose" batteries because the batteries power a wide range of devices for acceptable periods of time.

In addition to improving the length of time that their products will power a variety of devices, battery manufacturers constantly strive to reduce the cost of the battery. One way to reduce the cost is to decrease the quantity of electrochemically active material in one or both of the battery's electrodes. For example, the quantity of zinc in the anode and/or the quantity of manganese dioxide in the cathode could be reduced. However, this option is not acceptable to the manufacturer because any reduction in the quantity of electrochemically active material usually decreases the battery's "run time" which is the length of time the battery will run a device. Furthermore, reducing the volume of zinc in the anode can lead to inadequate electrical conductivity within the anode thereby causing sporadic or premature failure of the cell during discharge. This problem was recognized by the manufacturers of alkaline batteries when mercury was removed from the anode in order to make the batteries more environmentally friendly upon disposal. Unfortunately, removal of the mercury caused a significant portion of the cells to display erratic electrical discharge patterns due to the loss of conductivity between the zinc particles. To correct this problem, the quantity of zinc in the anode was increased thereby insuring a conductive matrix throughout the anode. In conventional cells that contain no added mercury and only particulate zinc powder as the anode's electrochemically active material, the anodes contained no less than 28 volume percent of particle zinc powder. As used herein, the phrase "no added mercury" means that the anode contains less than 50 ppm of mercury. Preferably, the anode contains no added mercury. Therefore, there is a widely recognized need to find a way to decrease the amount of electrochemically active material included mercury free cells without adversely impacting the cell's run time.

Previous attempts to address the problem of how to improve a battery's performance in a particular device, such as a digital camera, have usually involved changes to the cell's internal construction. In one example, the cell construction was modified by increasing the quantity of zinc in the anode. However, this change resulted in unacceptable leakage of electrolyte after the cell had been deeply discharged. In another example, instead of using a cell design in which one electrode is inserted into a centrally aligned cavity defined by the other electrode, some manufacturers have used a "jellyroll" construction in which two strip shaped electrodes and one separator are aligned with one another and then rolled to form a coil. Batteries with jellyroll constructions typically perform well in high drain devices. Unfortunately, the same cells provide substantially reduced service in low drain devices because a substantial portion of the electrochemically active material must be replaced with chemically inert separator due to the jellyroll's large anode-to-cathode surface area. Consequently, batteries made with a jellyroll construction are not well suited for use in devices where the cell's total electrochemical capacity is more important than the ability to discharge at a rapid rate.

Therefore, there is a need for an inexpensive mercury free alkaline electrochemical cell that has the ability to provide adequate run times in devices that require the battery to discharge at a high drain rate as well as provide adequate run times in devices that require the battery to discharge at a low drain rate.

BRIEF SUMMARY OF THE INVENTION

The present invention provides an electrochemical cell capable of discharging in an efficient manner under a variety of discharge conditions. In one embodiment, the electrochemical cell of this invention includes the following components. A container housing a first electrode that defines a cavity therein. A separator lines the cavity and abuts the first electrode. A second electrode, having less than 50 ppm of added mercury and a known volume, is disposed within the separator lined cavity. The second electrode includes zinc powder having a tap density greater than 2.80 g/cc and less than 3.65 g/cc. The zinc occupies less than 28.0 volume percent of the second electrode's volume. A quantity of alkaline electrolyte is disposed within the container and in contact with the electrodes and separator.

In another embodiment, this invention is a process that includes the following steps. Providing an open ended container housing a first electrode that defines a cavity which is lined by a separator. Mixing zinc powder, having a tap density greater than 2.80 g/cc and less than 3.65 g/cc, with a gelling agent and an alkaline solution to form a gelled mixture that has a known volume and less than 50 ppm of mercury. The zinc in the mixture occupies less than 28.0 volume percent of the mixture's volume. Disposing the mixture into the separator lined cavity. Sealing the container's open end thereby forming an enclosed electrochemical cell.

In another embodiment the electrochemical cell of the present invention is an LR6 battery that includes at least the following components and performance characteristics. A container housing a first electrode defining a cavity therein. A second electrode comprising less than 50 ppm of mercury and no more than 4.3 grams of zinc powder distributed uniformly throughout a gelled anode and disposed within the cavity defined by the first electrode. A separator located between the electrodes. An alkaline electrolyte contacting the separator and both electrodes. The cell, if discharged at 250 milliamps constant current for one hour per day, would have a minimum closed circuit voltage of 0.90 volts for at least 538 total accumulated minutes. Alternatively, the cell, if discharged across a 43 ohm resistor for four hours per day, would have a minimum closed circuit voltage of 0.9 volts for at least 99 total accumulated hours. Alternatively, the cell, if discharged continuously at a rate of one watt would have a minimum closed circuit voltage of 1.0 volts for at least 58 minutes.

In yet another embodiment, the present invention is an electrochemical cell that includes the following components. A container that houses a first electrode which defines a cavity therein. A separator lining the cavity and abutting the first electrode. A second electrode comprising zinc powder is disposed within the separator lined cavity. The zinc powder has a tap density greater than 2.80 g/cc and less than 3.65 g/cc, a BET specific surface area greater than 400 $cm^2$/g, a KOH absorption value of at least 14% and a $D_{50}$ less than 130 microns.

DESCRIPTION OF THE DRAWINGS

FIG. 2 is a chart showing the discharge efficiencies of cells of the present invention and commercially available cells;

FIG. 3 is a chart showing service capacity for cells of the present invention and commercially available cells;

DESCRIPTION

Figure 1:
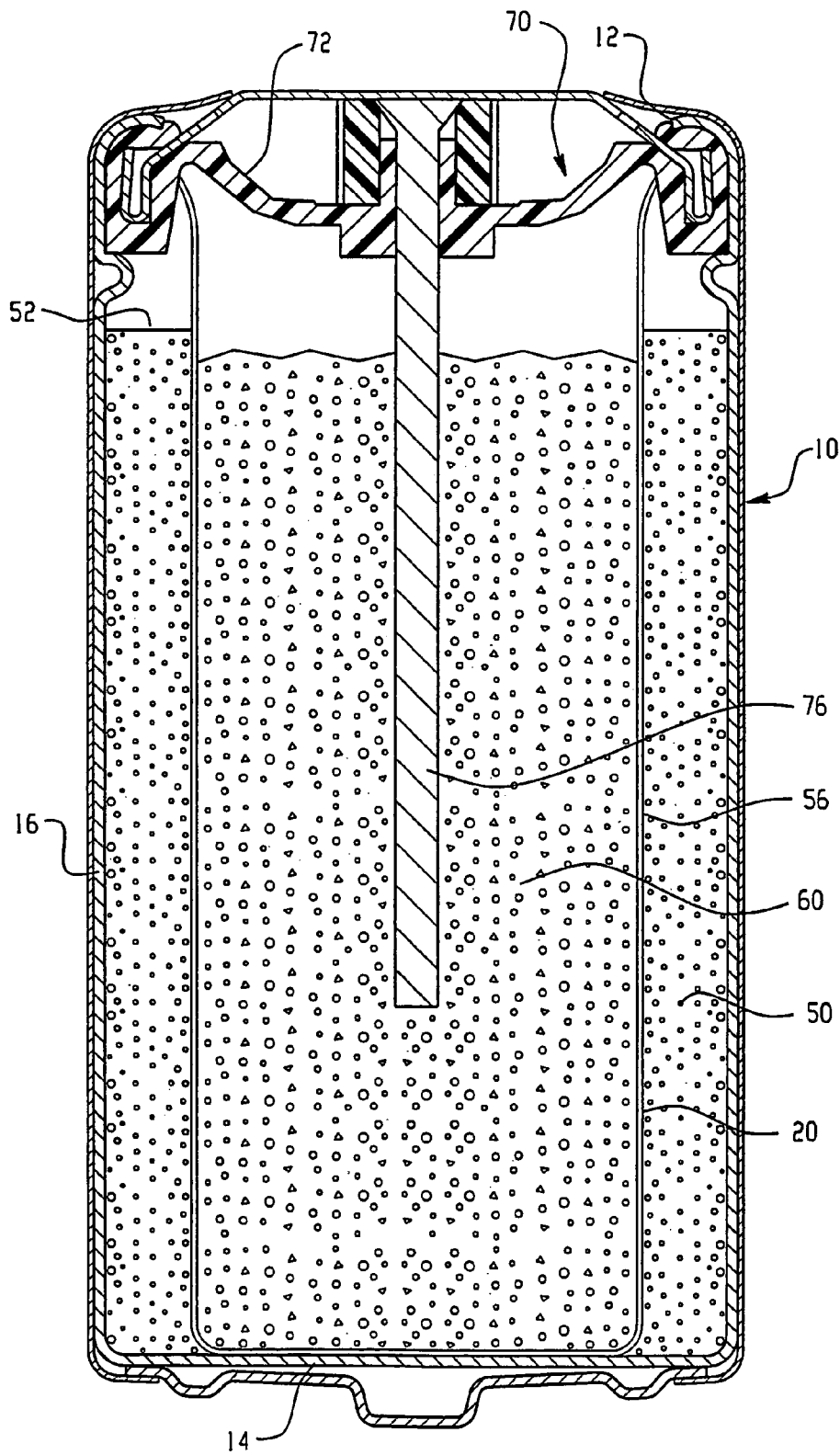
FIG. 1 is a cross-sectional view of an alkaline electrochemical cell of the present invention.

Referring now to the drawings and more particularly to FIG. 1, there is shown a cross-sectional view of an assembled electrochemical cell of this invention. Beginning with the exterior of the cell, the cell components are the container 10, first electrode 50 positioned adjacent the interior surface of container 10, separator 20 contacting the interior surface 56 of first electrode 50, second electrode 60 disposed within the cavity defined by separator 20 and closure assembly 70 secured to container 10. Container 10 has an open end 12, a closed end 14 and a sidewall 16 therebetween. The closed end 14, sidewall 16 and closure assembly 70 define a cavity in which the cell's electrodes are housed.

First electrode 50, also referred to herein as the cathode, is a mixture of manganese dioxide, graphite and an aqueous solution containing potassium hydroxide. The electrode is formed by disposing a quantity of the mixture into the open ended container and then using a ram to mold the mixture into a solid tubular shape that defines a cavity which is concentric with the sidewall of the container. First electrode 50 has a ledge 52 and an interior surface 56. Alternatively, the cathode may be formed by preforming a plurality of rings from the mixture comprising manganese dioxide and then inserting the rings into the container to form the tubularly shaped first electrode. The cell shown in FIG. 1 would typically include three or four rings.

Second electrode 60, also referred to herein as the anode, is a homogenous mixture of an aqueous alkaline electrolyte, zinc powder, and a gelling agent such as crosslinked polyacrylic acid. The aqueous alkaline electrolyte comprises an alkaline metal hydroxide such as potassium hydroxide, sodium hydroxide, or mixtures thereof. Potassium hydroxide is preferred. The gelling agent suitable for use in a cell of this invention can be a crosslinked polyacrylic acid, such as Carbopol 940®, which is available from Noveon, Inc., Cleveland, Ohio, USA. Carboxymethyylcellulose, polyacrylamide and sodium polyacrylate are examples of other gelling agents that are suitable for use in an alkaline electrolyte solution. The zinc powder may be pure zinc or an alloy. Optional components such as gassing inhibitors, organic or inorganic anticorrosive agents, binders or surfactants may be added to the ingredients listed above. Examples of gassing inhibitors or anticorrosive agents can include indium salts (such as indium hydroxide), perfluoroalkyl ammonium salts, alkali metal sulfides, etc. Examples of surfactants can include polyethylene oxide, polyethylene alkylethers, perfluoroalkyl compounds, and the like. The second electrode may be manufactured by combining the ingredients described above into a ribbon blender or drum mixer and then working the mixture into a wet slurry.

In addition to the aqueous alkaline electrolyte absorbed by the gelling agent during the anode manufacturing process, an additional quantity of an aqueous solution of potassium hydroxide, also referred to herein as "free electrolyte", may also be added to the cell during the manufacturing process. The free electrolyte may be incorporated into the cell by disposing it into the cavity defined by the first electrode. The method used to incorporate free electrolyte into the cell is not critical provided it is in contact with the first electrode 50, second electrode 60 and separator 20. A free electrolyte that may be used in the cell shown in FIG. 1 is an aqueous solution containing 36.5% by weight KOH.

In the bobbin-type zinc/manganese dioxide alkaline cell shown in FIG. 1, the separator 20 is commonly provided as a layered ion permeable, non-woven fibrous fabric which separates the cathode (first electrode) from the anode (second electrode). A suitable separator is described in WO 03/043103. The separator maintains a physical dielectric separation of the positive electrode material (manganese dioxide) and the negative electrode (zinc) material and allows for the transport of ions between the electrode materials. In addition, the separator acts as a wicking medium for the electrolyte and as a collar that prevents the anode gel from contacting the top of the cathode. A typical separator usually includes two or more layers of paper. Conventional separators are usually formed either by preforming the separator material into a cup-shaped basket that is subsequently inserted into the cavity defined by the first electrode or forming a basket during cell assembly by inserting into the cavity two rectangular sheets of separator material angularly rotated ninety degrees relative to each other. The conventional preformed separators are typically made up of a sheet of non-woven fabric rolled into a cylindrical shape that conforms to the inside walls of the first electrode and has a closed bottom end.

Closure assembly 70 comprises closure member 72 and current collector 76. Closure member 72 is molded to contain a vent 82 that will allow the closure member 72 to rupture if the cell's internal pressure becomes excessive. Closure member 72 may be made from Nylon 6,6 or another material, such as a metal, provided the current collector 76 is electrically insulated from the container 10 which serves as the current collector for the first electrode. Current collector 76 is an elongated nail shaped component made of brass. Collector 76 is inserted through a centrally located hole in closure member 72.

The composition of the second electrode will now be described in greater detail. A formula for a second electrode suitable for use in a cell of this invention is shown in Table 1. The quantities are expressed in weight percent.

TABLE 1

| Component | Weight Percent |
|---|---|
| Zinc powder | 67.20 |
| 32 wt % KOH solution | 31.00 |
| Gelling agent | 0.46 |
| 0.1 N KOH solution | 1.34 |

The process for preparing the anode includes the following steps. Mixing the 0.1 N KOH solution with the zinc powder. Mixing the 32 weight percent KOH solution with the gelling agent. The solution is absorbed by the gelling agent. The mixture of zinc powder and 0.1 N KOH solution is mixed with the gelling agent to form a homogenous mixture wherein the zinc particles are uniformly distributed throughout the mixture.

Anodes that are suitable for use in a primary (nonrechargeable) battery having an alkaline electrolyte are typically manufactured by combining particulate zinc with a gelling agent, an aqueous alkaline solution and optional additives as described above. The ratio of any one ingredient to one or more of the other ingredients can be adjusted, within certain limitations, to comply with various limitations that are imposed by: the processing equipment; cell design criteria such as the need to maintain particle-to-particle contact; and cost constraints. With regard to maintaining particle-to-particle contact in mercury free batteries, which are defined herein as containing less than 50 ppm of mercury in the anode, many cell designers have specified using at least 28 volume percent zinc powder in order to maintain particle-to-particle contact between the zinc particles. In contrast to this well known limitation on the volume of particulate zinc, the quantity of zinc in the anode in a cell of this invention can be reduced to less than 28.0 volume percent. Cells made with less than 27.0 volume percent zinc, more specifically 26.9 volume percent zinc, were made as described below. Anodes made with 27.0 volume percent zinc, 26.0 volume percent zinc or 24.0 volume percent zinc are feasible. The volume percent zinc is determined by dividing the volume of zinc by the volume of the anode just prior to dispensing the anode into the separator lined cavity as will be explained below. The volume percent zinc must be determined before dispensing the anode into the separator basket because a portion of the electrolyte incorporated into the anode migrates into the separator and cathode as soon as the anode is inserted into the cavity defined by the separator. The volume percent zinc is determined using the following procedure. Calculate the volume of zinc in a cell by dividing the weight of zinc in the cell by the density of zinc (7.13 g/cc). Calculate the volume of the anode mix by dividing the weight of the anode mix just prior to disposing the anode mix in the cell by the measured density of the anode mix. Then divide the volume of zinc by the volume of the anode mix to obtain the volume percent zinc. The apparent density of the anode mix is determined using the following procedure. Weigh an empty container having a known volume, such as 35 cc. Dispose a quantity of anode into the container such that the anode completely fills the container. Calculate the weight of the anode by weighing the filled container and then subtracting the weight of the empty container. Divide the anode's weight by the volume of the container to get the anode's apparent density.

Limiting the quantity of powdered zinc to less than 28 percent of the anode's volume is believed to be a contradistinction to conventional mercury free cell designs that incorporate only particulate zinc in the zinc powder. Reducing the quantity of zinc to less than 28 volume percent is significant because a gelled anode containing less than 50 ppm of mercury must have a minimum volume of particulate zinc in order to establish and maintain particle-to-particle contact between the zinc particles that are uniformly distributed throughout the height and width of the anode. The particle-to-particle contact must be maintained during the entire useful life of the battery. If the volume of zinc in the anode is too low, the cell's voltage may suddenly drop to an unacceptably low value when the cell is powering a device. The voltage drop is believed to be caused by a loss of continuity between some of the anode's zinc particles thereby electrically isolating a portion of the anode so that it cannot participate in the cell's discharge. If the voltage remains low, the cell must be replaced by the consumer. If the voltage quickly recovers to an acceptable value, the device may resume working in a normal manner. However, the consumer could incorrectly perceive the temporary interruption in the device's performance as a sign that the battery is about to expire and may be motivated to replace the cell prematurely. Consequently, cell manufacturers have conventionally used more than the minimum volume of particulate zinc in a mercury free gelled anode in order to insure reliable service throughout the complete life of the battery.

Zinc useful in a cell of this invention may be purchased from N.V. UMICORE, S.A., in Brussels, Belgium under the designation BIA 115. The zinc is manufactured in a centrifugal atomization process as generally described in international publication number WO 00/48260 which published on Aug. 17, 2000. This publication discloses the composition of the zinc alloy and the manufacturing process used to produce the zinc powder. However, many physical characteristics of the zinc particles are not disclosed. In a preferred embodiment, the zinc powder in a cell of this invention has many of the following physical and chemical characteristics. First, the zinc powder's particle size is characterized as having a $D_{50}$ median value less than 130 microns, more preferably between 100 and 130 microns, and most preferably between 110 and 120 microns. The $D_{50}$ median value is determined by using the sieve analysis procedure described in the American Society for Testing and Materials (ASTM) standard B214-92, entitled Standard Test Method for Sieve Analysis of Granular Metal Powders, and the reporting procedure described in ASTM D1366-86 (Reapproved 1991), entitled Standard Practice for Reporting Particle Size Characteristics of Pigments. ASTM standards B214-92 and D1366-86 (Reapproved 1991) are herein incorporated by reference. As used in this document, the zinc powder's $D_{50}$ median value is determined by plotting the cumulative weight percentages versus the upper class size limits data, as shown in ASTM D-1366-86, and then finding the diameter (i.e. $D_{50}$) that corresponds to the fifty percent cumulative weight value. Second, the zinc powder's BET specific surface area is at least 400 $cm^2$/g. More preferably, the surface area is at least 450 $cm^2$/g. The BET specific surface area is measured on Micromeritics' model TriStar 3000 BET specific surface area analyzer with multi point calibration after the zinc sample has been degassed for one hour at 150° C. Third, the zinc powder's tap density is greater than 2.80 g/cc and less than 3.65 g/cc. More preferably, the tap density is greater than 2.90 g/cc but less than 3.55 g/cc. Most preferably, the zinc powder's tap density is greater than 3.00 g/cc and less than 3.45 g/cc. The tap density is measured using the following procedure. Dispense fifty grams of the zinc powder into a 50 cc graduated cylinder. Secure the graduated cylinder containing the zinc powder onto a tap density analyzer such as a model AT-2 "Auto Tap" tap density analyzer made by Quanta Chrome Corp. of Boynton Beach, Fla., U.S.A. Set the tap density analyzer to tap five hundred and twenty times. Allow the tap density analyzer to run thereby tapping the graduated cylinder by rapidly displacing the graduated cylinder in the vertical direction five hundred and twenty times. Read the final volume of zinc powder in the graduated cylinder. Determine the tap density of the zinc powder by dividing the weight of the zinc powder by the volume occupied by the zinc powder after tapping. Fourth, the zinc powder has a KOH absorption value of at least 14%. More preferably, the KOH absorption value is 15% or higher. The process used to determine the KOH adsorption value is described below in the portion of the specification pertaining to FIG. 5.

In addition to the physical characteristics described above, the preferred zinc is an alloy with bismuth and/or indium and/or aluminum incorporated therein. The preferred quantity of bismuth is between 75 and 125 ppm. The preferred quantity of indium is between 175 and 225 ppm. The preferred quantity of aluminum is between 75 and 125 ppm.

Within the battery industry, one widely accepted protocol used to evaluate and characterize batteries involves discharging individual cells on predefined electrical test circuits and then recording the length of time the battery can maintain a minimum closed circuit voltage. These "discharge tests" are used by battery manufacturers to evaluate the run time of different cell constructions. In order to standardize the evaluation of a battery's performance on discharge tests, many cell sizes and test regimes have been defined and approved by organizations such as the American National Standards Institute (ANSI) and the International Electrotechnical Commission (IEC). Battery sizes, such as LR6 size batteries, are defined by the IEC's *International Standard* 60086-2, edition 10.1, as having a maximum height of 50.5 mm and a maximum diameter of 14.5 mm. One publication that describes discharge tests for batteries, such as LR6 batteries, is entitled *ANSI C18.1M, Part 1-2001—American National Standard for Portable Primary Cells and Batteries with Aqueous Electrolyte—General Specifications* which was published in 2001 by the National Electrical Manufacturers Association. The discharge tests for the LR6 batteries described therein on page 19 are widely accepted within the battery industry as an acceptable way to evaluate a battery's electrochemical service performance. Some of the tests are commonly identified as "high rate" tests while others are identified as "high tech" tests and yet other tests are known as "low rate" tests.

In one experiment, several LR6 batteries of the present invention were constructed. The physical arrangement of the cell's electrodes, separator, closure assembly and container is disclosed in FIG. 1. The formula used to make the second electrode is disclosed in Table 1. The experimental cells were manufactured as follows. The following cathode materials were mixed together and formed into rings that were inserted into the container thereby forming a tubularly shaped cathode: electrolytic manganese dioxide (90.96 wt. %); graphite (4.49 wt. %), aqueous solution of 40 wt % KOH (3.72 wt. %); coathylene binder (0.44 wt. %); and niobium doped titanium dioxide (0.39 wt. %). The inner surface of the cathode defines a circular, centrally located cavity. A strip of separator material was rolled and shaped to form a tube having an open end and a closed end. The tubularly shaped separator was inserted into the cavity defined by the cathode. A 6.36 gram quantity of the second electrode, having having an apparent density of 2.85 g/cc, was disposed into the separator lined cavity. The anode's volume, 2.23 cc, is determined by dividing 6.36 g by 2.85 g/cc. The quantity of zinc in each cell was 4.27 g. The zinc's volume, 0.60 cc, was determined by dividing 4.27 g by 7.13 g/cc. The volume percent zinc, 26.9%, was determined by dividing 0.60 cc by 2.23 cc. In addition to the electrolyte contained in the second electrode, another 0.96 cc of 36.5% by weigh KOH solution was disposed into the separator lined cavity. A first portion of the 0.96 cc was injected into the separator lined cavity before the second electrode was inserted. The remaining portion of 36.5% by weight KOH solution was injected into the separator lined cavity after the second electrode had been inserted. A closure assembly was then secured to the open end of the container. A terminal cover and label were secured to the outer surface of the container.

Cells constructed according to the present invention were then discharged on three separate service tests as will be described below. As part of the same experiment, commercially available LR6 batteries from several different manufacturers were also evaluated on the same discharge tests. The test results are shown in FIG. 3. On each test, cells of this invention provided higher average service than any of the commercially available cells.

One of the low rate tests for LR6 size batteries specifies that a battery be discharged across a 43 ohm resistor for four hours and then allowed to rest for twenty hours. The test is continued each day until the battery's closed circuit voltage drops below 0.9 volts which is considered to be the functional end point at which many devices, such as a radio, stop working. As shown in FIG. 3, when eight cells of the present invention were discharged on the 43 ohm four hour per day test described above, the average run time was 100.4 hours. In contrast, the best individual run time (not shown) from any of the commercially available cells was 97.7 hours.

A high tech test for LR6 size batteries specifies that the battery be discharged at 250 milliamps constant current for one hour per day and then allowed to rest for twenty-three hours. The test is continued each day until the battery's closed circuit voltage falls below 0.9 volts. As shown in FIG. 3, when ten cells of the present invention were discharged on the 250 milliamp constant current test for one hour per day as described above, the average run time was 552 minutes. Every cell of the present invention exceeded as least 538 minutes of run time. Data in FIG. 3 also shows that commercially available batteries from four battery manufacturers were tested on the 250 milliamp constant current test. The average run time of the commercially available cells ranged from 467 minutes to 510 minutes.

A high rate test for LR6 size batteries requires the battery to be discharged continuously at a 1000 milliwatt drain rate until the battery's closed circuit voltage drops below 1.0 volts. As shown in FIG. 3, when five cells of the present invention were evaluated on the 1000 milliwatt test, the average run time was 60 minutes. All of the cells of the present invention exceeded at least 58 minutes of run time. Data in FIG. 3 also shows that commercially available batteries from four battery manufacturers were tested on the 1000 milliwatt test. The highest average run time of the commercially available batteries was 47 minutes. None of the individual commercially available batteries exceeded 49 minutes.

All of the battery tests described above were conducted in an environment in which the ambient temperature was approximately 21° C. Maintaining an ambient temperature between 19° C. and 23° C. is important because a battery's run time on a discharge test may increase as the ambient temperature increases and may decrease as the ambient temperature decreases. The extent of the impact of the change in ambient temperature on the run time varies by test. As is well known in the battery manufacturing industry, when batteries are discharged, the exothermal chemical reactions taking place within the battery cause the battery's temperature to increase. On high drain tests, the temperature on the surface of the cell may exceed 40° C. Consequently, the cell's temperature and the ambient temperature may differ substantially and are considered to be two different characteristics.

Shown in FIG. 2 is a chart of various cell constructions showing the discharge efficiency of the anode on several different discharge tests. As used herein, the discharge efficiency of the anode is determined by dividing the cell's ampere hour output by the zinc's theoretical ampere hour input. The zinc's input is calculated by multiplying the number of grams of zinc by 821 mAhr/g. For example, a cell containing 4.3 grams of zinc would be considered to have an input of 3,530 mAhr. If the same cell provided 3000 mAhr of output on a discharge test, then the discharge efficiency of the zinc would be 85%.

As can be seen by examining the data shown in FIG. 2, cells of the present invention had average anode discharge efficiencies that were higher than the average anode discharge efficiencies of five brands of commercially available cells on the low drain, high tech and high drain tests described below. For example, cells of the present invention had an average anode discharge efficiency of 77.8% when discharged on the 43 ohm four hour per day low drain service test. In contrast, samples from five commercially available brands of batteries had average anode discharge efficiencies of 72.8% or lower. The five percent differential, between 77.8% and 72.8% is a substantial and significant increase in discharge efficiency. On the 250 milliamp for one hour per day high tech test, cells of the present invention had an average anode discharge efficiency of 61.1%. The five brands of commercially available batteries had average anode discharge efficiencies of 56.4% or less. On the 1000 milliwatt high drain continuous test, cells of the present invention had an average discharge efficiency of 22.8%. The five brands of commercially available batteries had an average discharge efficiency of 17.4% or less. The 4.4% improvement represents a 25 percent improvement over the best commercially available cells.

Figure 4:
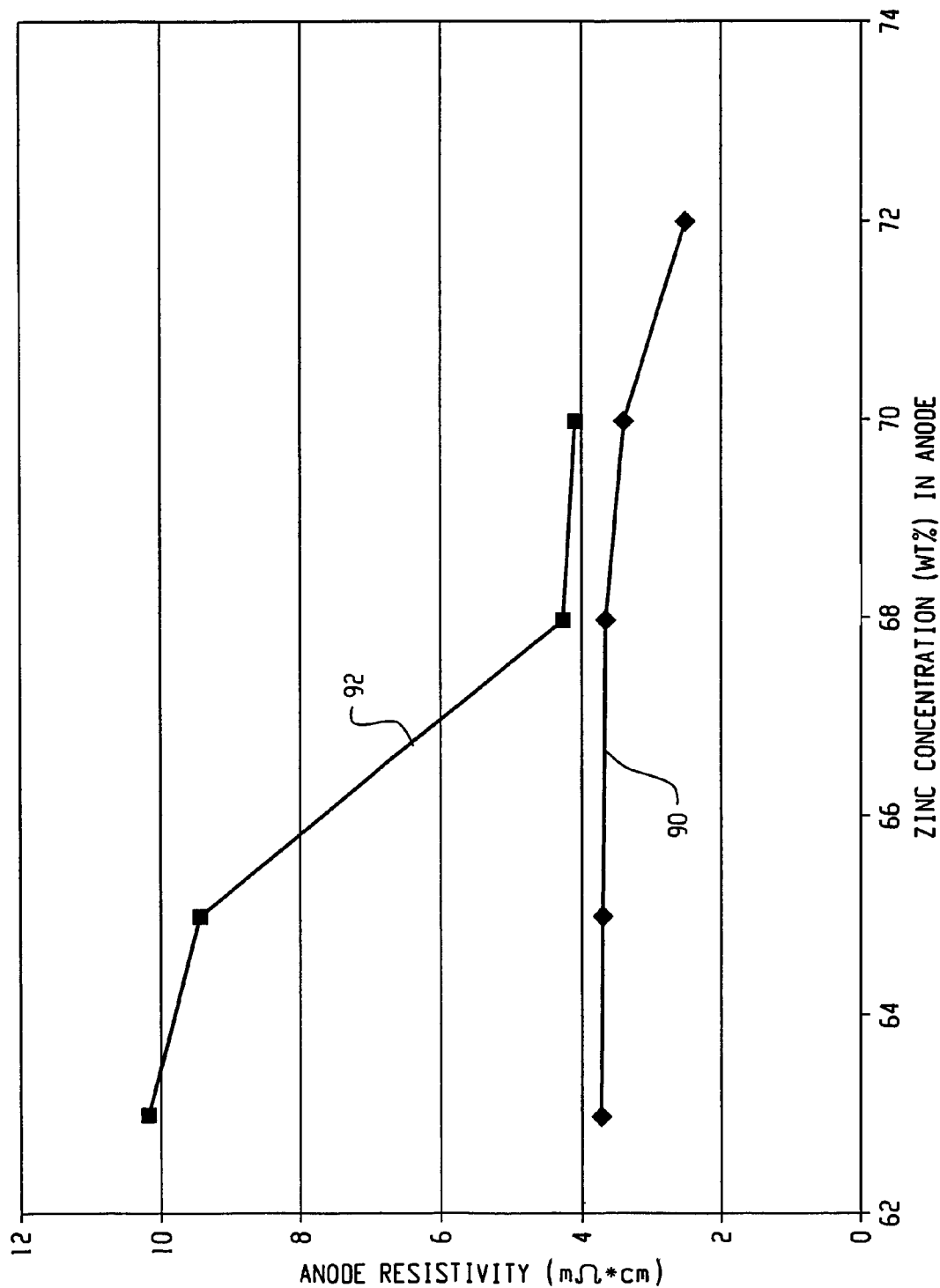
FIG. 4 is a graph that shows the resistivities of anode mixes.

FIG. 4 is a graph showing the resistivity of several anode mixes versus the weight percent zinc in the anode. The data represents resistivity measurements from eight different anode mixes. Each anode mixture contained the same four components shown in Table 1 except that the solution contained 36% by weight KOH instead of 32% by weight KOH. However, as the weight percent zinc was varied from 63% to 72%, the quantities of the other three components also had to be adjusted. The formulas and measured resistivities for the anode mixtures are shown in Table 2.

TABLE 2

| Component | wt % | | | |
|---|---|---|---|---|
| Zinc | 63 | 65 | 68 | 70 |
| 36% KOH | 35.221 | 33.21 | 30.195 | 28.411 |
| Gelling Agent | 0.519 | 0.490 | 0.445 | 0.419 |
| 0.1 N KOH | 1.26 | 1.30 | 1.36 | 1.17 |
| Resistivity (mΩ·cm) of zinc used in a cell of this invention | 3.714 | 3.725 | 3.673 | 3.398 |

TABLE 2-continued

| Component | wt % | | | |
|---|---|---|---|---|
| Resistivity (mΩ·cm) of commercially available zinc | 10.203 | 9.478 | 4.284 | 4.088 |

The resistivities were measured by applying a frequency that ranged from 65 k Hz to 1 Hz with a small voltage perturbation, such as 10 mV, to a quantity of anode mix trapped inside a cylindrical tube having a constant inside diameter herein designated as D. The length of the tube occupied by the anode is designated L. The anode's resistance was derived from the impedance data at the high frequency end of the sweep. The resistivity was calculated using the following formula:

Resistance=Resistivity $(L/S)$ wherein $S=(D/2)^2\pi$.

The resistivities of the five anode mixtures that contained zinc used in a cell of the present invention were used to plot curve 90 in FIG. 4. The resistivities of the anode mixtures that contained commercially available zinc powder were used to plot curve 92. The curves in FIG. 4 clearly show that the resistivities of the anode mixtures containing the zinc powder used in a cell of this invention did not increase significantly when the weight percent zinc was reduced below 68 weight % whereas the anode mixtures represented by curve 92 did experience a significant increase from 4 mΩ·cm to more than 9 mΩ·cm. Since any increase in the cell's internal resistance results in a decrease in the cell's run time, there is a definite advantage to using zinc powder that does not cause the anode mixture's resistivity to increase when the weight percent zinc is decreased below 68 weight %.

Figure 5:
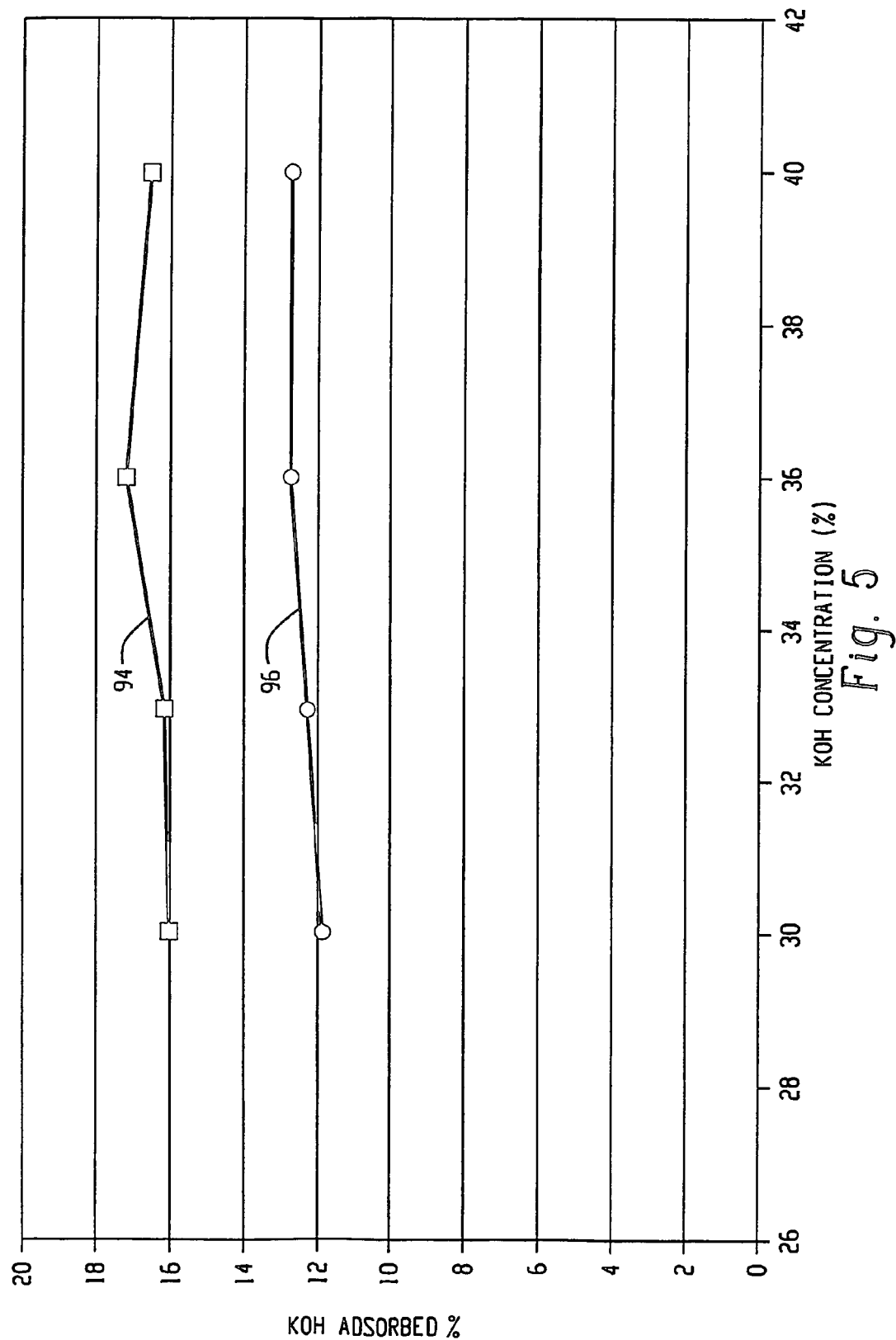
FIG. 5 is a graph that shows KOH absorption values for two zinc powders.

FIG. 5 shows the KOH absorption values for zinc powers using different weight percentages of KOH. The following process was used to determine the zinc's KOH absorption value. First, provide a 5 cc syringe and a piece of separator that has been soaked in 32 wt % KOH and is appropriately sized to facilitate insertion of the separator into the large open end of the syringe and can be pushed through the syringe thereby blocking the smaller opening in the opposite end of the syringe. Second, weigh the syringe and separator containing absorbed electrolyte. Third, dispose two milliliters of a 32% by weight aqueous KOH solution into the large open end of the syringe while blocking the flow of the electrolyte through the smaller opening in the opposite end of the syringe. Fourth, a known quantity of particulate zinc, such as five grams, is carefully weighed and disposed into the open end of the syringe. The shape of the container, the volume of the solution and the volume of the zinc must be coordinated to insure that all of the zinc particles are fully submerged beneath the surface of the aqueous KOH solution. Fifth, an additional 1.5 cc of 32% by weight KOH solution is introduced into the container to insure that the zinc is fully covered with the solution. Sixth, the KOH solution is allowed to drain through the small opening at one end of the syringe for 120 minutes by orienting the syringe in a vertical position and removing the object that blocks the small opening. To insure that there are no droplets of unabsorbed solution trapped between the particles of zinc, the container is lightly tapped several times onto a paper towel until no additional KOH solution is observed landing on the paper towel. Seventh, the combined weight of the zinc with the solution adsorbed thereon, the syringe and the separator is then determined. The quantity of electrolyte solution adsorbed onto the surface of the zinc is determined by subtracting the weight of the dry zinc particles, wet separator and syringe from the combined weight of the syringe containing zinc with adsorbed electrolyte thereon and the wet separator. The KOH absorption value is determined by dividing the weight of the KOH adsorbed onto the zinc by the weight of the zinc particles prior to disposing them into the solution.

In FIG. 5, curve 94 represents the KOH adsorption values for zinc useful in a cell of this invention. Curve 96 represents the KOH adsorption values for commercially available zinc. Although the weight percent KOH in the adsorbed solution was varied from 30% to 40%, the quantity of solution adsorbed by the zinc useful in a cell of this invention was at least 14%. Furthermore, the KOH adsorption for the same samples exceeded at least 15%. In contrast, the KOH adsorption for the commercially available zinc did not exceed 13%. The KOH adsorption value of a particular zinc powder is believed to be one of several measurable characteristics that are useful in identifying zinc that would be useful in a cell of this invention.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

We claim:

1. An electrochemical cell, comprising:
   a) a container housing a first electrode, said electrode defining a cavity therein;
   b) a separator lining said cavity and abutting said first electrode;
   c) a second electrode disposed within said separator lined cavity, said second electrode having a known volume and less than 50 ppm of mercury, said second electrode comprises zinc powder having a tap density greater than 2.80 g/cc and less than 3.65 g/cc, said zinc powder occupies less than 28.0 volume percent of said second electrode's volume and said zinc powder has a BET specific surface area greater than 400 cm$^2$/g; and
   d) a quantity of alkaline electrolyte disposed within said container and in contact with said electrodes and said separator.

2. The electrochemical cell of claim 1, wherein the volume of zinc is no greater than 27.0% of the second electrode's volume.

3. The electrochemical cell of claim 1, wherein the volume of zinc is no greater than 26.0% of the second electrode's volume.

4. The electrochemical cell of claim 1, wherein the volume of zinc is no greater than 24.0% of the second electrode's volume.

5. The electrochemical cell of claim 1, wherein the second electrode comprises a gelling agent, said gelling agent comprises an absorbed quantity of an aqueous alkaline solution, said solution comprises no more than 36% by weight potassium hydroxide.

6. The electrochemical cell of claim 5, wherein said solution comprises no more than 34% by weight potassium hydroxide.

7. The electrochemical cell of claim 5, wherein said solution comprises no more than 32% by weight potassium hydroxide.

8. The electrochemical cell of claim 5 wherein said second electrode has a resistivity value less than 4 mΩ·cm.

9. The electrochemical cell of claim 1 wherein said particulate zinc has a KOH absorption value of at least 14% and a $D_{50}$ less than 130 microns.

10. The electrochemical cell of claim 9, wherein said BET specific surface area is greater than 450 cm$^2$/g.

11. The electrochemical cell of claim 9, wherein said KOH absorption value is at least 15%.

12. The electrochemical cell of claim 9 wherein said $D_{50}$ is between 100 and 130 microns.

13. The electrochemical cell of claim 1 wherein said tap density is greater than 2.90 g/cc and less than 3.55 g/cc.

14. The electrochemical cell of claim 1 wherein said tap density is greater than 3.00 g/cc and less than 3.45 g/cc.

15. The electrochemical cell of claim 12, wherein said $D_{50}$ is between 110 and 120 microns.

16. The electrochemical cell of claim 1 wherein said particulate zinc is a zinc alloy comprising bismuth between 75 ppm and 125 ppm, indium between 175 ppm and 225 ppm, and aluminum between 75 ppm and 125 ppm.

17. An LR6 size electrochemical cell, comprising:
    a) a cylindrical container housing a first electrode defining a centrally located cavity therein;
    b) a second electrode having less than 50 ppm of mercury and disposed within said cavity, said second electrode comprising no more than 4.3 grams of zinc powder having a tap density between 2.80 g/cc and 3.65 g/cc and a BET specific surface area greater than 400 cm$^2$/g;
    c) a separator located between said electrodes; and
    d) a quantity of alkaline electrolyte in contact with said electrodes and separator;
    wherein said cell, if discharged at 250 milliamps constant current for one hour per day, would have a minimum closed circuit voltage of 0.90 volts for at least 538 total accumulated minutes.

18. The electrochemical cell of claim 17, wherein said cell, if discharged across a 43 ohm resistor for four hours per day, would have a minimum closed circuit voltage of 0.9 volts for at least 100 total accumulated hours.

19. The electrochemical cell of claim 17 wherein said second electrode comprises a gelling agent, said gelling agent comprises an absorbed quantity of an aqueous solution, said solution comprises no more than 36% by weight KOH.

20. The electrochemical cell of claim 19, wherein said second electrode comprises, in addition to said zinc powder, an aqueous solution having no more than 33 weight percent potassium hydroxide, said weight percent of potassium hydroxide based on the total quantities of water and potassium hydroxide in said second electrode just prior to disposing the second electrode into said container.

21. The electrochemical cell of claim 20, wherein said potassium hydroxide in said second electrode's aqueous solution is less than 32 weight percent.

22. The electrochemical cell of claim 21, wherein said potassium hydroxide in said second electrode's aqueous solution is no more than 31 weight percent.

23. The electrochemical cell of claim 17, wherein the volume of zinc occupies less than 24.0% of the second electrode's volume.

24. An LR6 electrochemical cell, comprising:
    a. a cylindrical container housing a first electrode defining a centrally located cavity therein;
    b. a second electrode disposed within said cavity, said second electrode comprising no more than 4.3 grams of zinc powder having a tap density between 2.80 g/cc and 3.65 g/cc, a BET specific surface area greater than 400 cm$^2$/g and less than 50 ppm of mercury;
    c. a separator located between said electrodes; and d. a quantity of electrolyte in contact with said electrodes and separator;

wherein said cell, if discharged across a 43 ohm resistor for four hours per day, would have a minimum closed circuit voltage of 0.9 volts for at least 100 total accumulated hours.

25. The electrochemical cell of claim 24, wherein said cell, if continuously discharged at a rate of one watt, would have a minimum closed circuit voltage of 1.0 volts for at least 58 minutes.

26. The electrochemical cell of claim 24, wherein said second electrode comprises, in addition to said zinc powder, an aqueous solution having no more than 33 weight percent potassium hydroxide, said weight percentage of potassium hydroxide based on the total quantities of water and potassium hydroxide in said second electrode just prior to disposing the second electrode into said container.

27. The electrochemical cell of claim 26, wherein said potassium hydroxide in said second electrode's aqueous solution is less than 32 weight percent.

28. The electrochemical cell of claim 27, wherein said potassium hydroxide in said second electrode's aqueous solution is no more than 31 weight percent.

29. The electrochemical cell of claim 24, wherein the volume of zinc occupies less than 24.0% of the second electrode's volume.

30. An LR6 electrochemical cell, comprising:
a) a cylindrical container housing a first electrode defining a centrally located cavity therein;
b) a second electrode disposed within said cavity and having less than 50 ppm of added mercury, said second electrode comprising no more than 4.3 grams of zinc powder having a tap density between 2.80 g/cc and 3.65 g/cc and a specific surface area greater than 400 cm$^2$/g;
c) a separator located between said electrodes; and
d) a quantity of electrolyte in contact with said electrodes and separator;

wherein said cell, if continuously discharged at a rate of one watt, would have a minimum closed circuit voltage of 1.0 volts for at least 58 minutes.

31. The electrochemical cell of claim 30, wherein said cell, if discharged at 250 milliamps constant current for one hour per day, would have a minimum closed circuit voltage of 0.90 volts for at least 538 total accumulated minutes.

32. The electrochemical cell of claim 30, wherein said second electrode comprises, in addition to said particulate zinc, an aqueous solution having no more than 33 weight percent potassium hydroxide, said weight percentage of potassium hydroxide based on the total quantities of water and potassium hydroxide in said second electrode just prior to disposing the second electrode into said container.

33. The electrochemical cell of claim 32, wherein said potassium hydroxide in said second electrode's aqueous solution is less than 32 weight percent.

34. The electrochemical cell of claim 33, wherein said potassium hydroxide in said second electrode's aqueous solution is no more than 31 weight percent.

35. The electrochemical cell of claim 30, wherein the volume of zinc occupies less than 24.0% of the second electrode's volume.

36. An electrochemical cell, comprising:
a) a container housing a first electrode, said electrode defining a cavity therein;
b) a separator lining said cavity and abutting said first electrode;
c) a second electrode comprising zinc powder and disposed within said separator lined cavity, said zinc powder having a tap density greater than 2.80 g/cc and less than 3.65 g/cc, a BET surface area greater than 400 cm$^2$/g, a KOH absorption value of at least 14%, and a $D_{50}$ less than 130 microns; and
d) a quantity of alkaline electrolyte disposed within said container and in contact with said electrodes and said separator.

37. The electrochemical cell of claim 36 wherein said tap density is greater than 2.90 g/cc and less than 3.55 g/cc.

38. The electrochemical cell of claim 37 wherein said tap density is greater than 3.0 g/cc and less than 3.45 g/cc.

39. The electrochemical cell of claim 36, wherein said BET specific surface area is greater than 450 cm$^2$/g.

40. The electrochemical cell of claim 36, wherein said KOH absorption value is at least 15%.

41. The electrochemical cell of claim 36 wherein said $D_{50}$ is between 100 and 130 microns.

42. The electrochemical cell of claim 41, wherein said $D_{50}$ is between 110 and 120 microns.

43. The electrochemical cell of claim 36 wherein said zinc powder is a zinc alloy comprising bismuth between 75 ppm and 125 ppm, indium between 175 ppm and 225 ppm, and aluminum between 75 ppm and 125 ppm.

44. The electrochemical cell of claim 36, wherein the volume of zinc occupies less than 24.0% of the second electrode's volume.

* * * * *